(No Model.)

S. WALTER.
ATTACHING SPOUTS, &c., TO VESSELS.

No. 509,412. Patented Nov. 28, 1893.

Witnesses.
Rott D. Samuels
A. Arndt

Inventor.
Sebastian Walter

UNITED STATES PATENT OFFICE.

SEBASTIAN WALTER, OF MILWAUKEE, WISCONSIN, ASSIGNOR TO THE KIECKHEFER BROTHERS COMPANY, OF SAME PLACE.

ATTACHING SPOUTS, &c., TO VESSELS.

SPECIFICATION forming part of Letters Patent No. 509,412, dated November 28, 1893.

Application filed May 18, 1893. Serial No. 474,669. (No model.)

*To all whom it may concern:*

Be it known that I, SEBASTIAN WALTER, of Milwaukee, in the county of Milwaukee and State of Wisconsin, have invented a new and useful Improvement in Attaching Spouts and Analogous Devices to Vessels, of which the following is a description, reference being had to the accompanying drawings, which are a part of this specification.

A great variety of vessels are now manufactured of sheet metal and finished by enameling them. Many such vessels are made of sheet iron, and require a spout or analogous device. The spout is attached to the vessel before enameling, and it is desirable to secure the spout firmly and enduringly to the vessel, in such manner as to make a close joint, with the fewest and least possible projections, so that the joint will be completely and enduringly covered by the enamel. It will be understood that solder can not be utilized to attach a spout to a vessel on which enamel is used for finishing, as even if the solder could be made to adhere suitably to the iron surface, the great heat required in the process of enameling would fuse the solder and detach the spout. It is also desirable that the attachment should be simple in character and inexpensive in construction.

The object of my invention is to secure the desirable features above stated, and the invention consists in the manufacture herein described and claimed, or its equivalents.

For conveniently illustrating my invention I show it in connection with the attaching of a spout to a tea or coffee pot.

Figure 1:
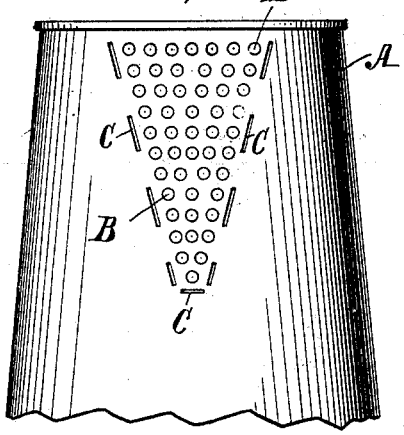
Figure 2:
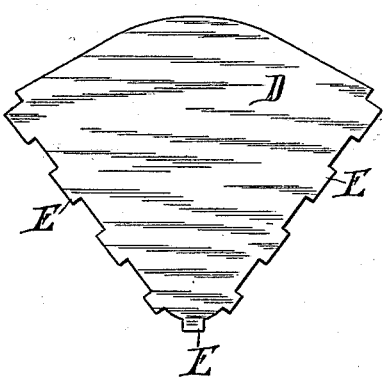
Figure 3:
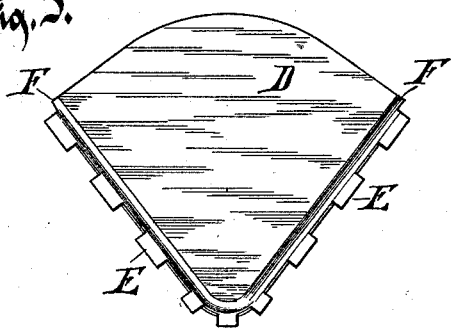
Figure 4:
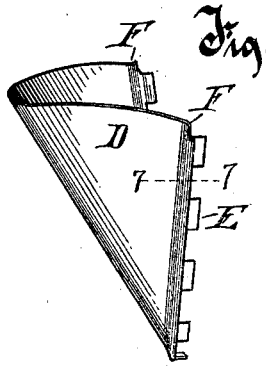
Figure 5:
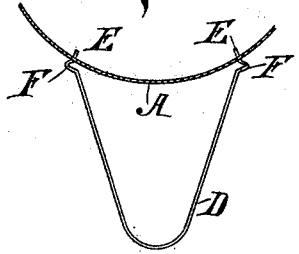
Figure 7:
Figure 6:
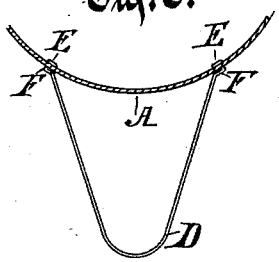
Figure 8:

In the drawings, Figure 1, is an elevation of a fragment of a coffee pot, showing that portion of the vessel, to which the spout is to be attached. Fig. 2, is the sheet metal blank or planchet, in the form in which it is cut from the sheet of metal. Fig. 3, is the blank shown in Fig. 2 in which a bead or partially formed flange has been struck up along near the entire portion of the edge that is to abut against the vessel to which it is to be attached. Fig. 4, is the same blank shown in Figs. 2 and 3 after it has been shaped up into the form of a spout. Fig. 5, is a diagram partly in section, of the spout in the process of being attached to the vessel. Fig. 6, is a diagram partly in section, of the spout, completely attached to the vessel. Fig. 7, is a detail in section of a fragment of the spout, showing the bead on the spout as related to the other parts. Fig 8, is a detail in section of a fragment of the vessel and of the spout, showing in about actual size, the construction and relation of the parts at the joint between the spout and the vessel to which it is secured.

The vessel A, constructed of sheet iron, is provided with the apertures B B in its wall at one side for straining or discharging its liquid contents therethrough, and out of the spout to be attached to the vessel, inclosing the apertures B. Slots C C are provided in the wall of the vessel along the line of junction of the spout thereto, to receive therein tongues formed on the spout, herein described.

A blank D, in the form shown in Fig. 2, is cut from sheet metal to be formed into a spout, to be attached to the vessel, in the manner herein described. The blank as cut out, is provided with a series of tongues E E along all that part of its edge which is to abut against and be secured to the vessel. These tongues E E are made and arranged to register with and fit into, the slots C C in the vessel. A bead or partially formed flange F is then struck up along the entire portion of the edge that is to abut against the vessel. This bead is struck up or projects from the plane of the blank, on that side that is to become the outer surface of the spout. The blank is then swaged, or struck up into the form of the spout, which in the case illustrated in the drawings, is in the form shown in Fig. 4. The particular form of the spout, nozzle or lip, forms no part of my invention. The tongues E E are then inserted in the slots C C, assuming substantially the form illustrated in Fig. 5, and the bead F is then forcibly folded together and pressed down as a flange against the outside of the vessel, and the tongues E E are overturned and clinched tightly down against the vessel on the inside. This secures the spout to the vessel rigidly and tightly, substantially in the manner shown in Figs. 6 and 8. The joint thus formed is comparatively smooth and very neat in appearance while it is strong and enduring, and the attachment is quickly and inexpensively made. The attachment of the spout to the vessel in this manner presents no thin edge or high projections, but is exceedingly well adapted to receive and retain enamel thereon.

What I claim as my invention, and desire to secure by Letters Patent, is—

As an article of manufacture, a sheet iron vessel provided with a number of apertures formed in a group in the upper part of the body of the vessel, said apertures being adapted for a strainer, and a series of elongated apertures along near the sides and bottom of the group of apertures aforesaid, and a spout provided with a series of integral tongues as wide as the elongated apertures in the body of the vessel, and with inter-dental spaces as wide as, and having an edge adapted to fit, the spaces on the vessel between the elongated apertures, which tongues pass through the elongated apertures and are turned down against the inner surface of the vessel, and a continuous bead or flange on the spout along that part of it that contacts with the vessel, folded and pressed down wholly on the outside of and against the body of the vessel, substantially as described.

In testimony whereof I affix my signature in presence of two witnesses.

SEBASTIAN WALTER.

Witnesses:
ROBT. D. SAMUELS,
A. ARNDT.